(12) United States Patent
Menegoli et al.

(10) Patent No.: US 6,498,446 B1
(45) Date of Patent: Dec. 24, 2002

(54) SYSTEM AND METHOD FOR OPTIMIZING TORQUE IN A POLYPHASE DISK DRIVE MOTOR

(75) Inventors: Paolo Menegoli; Ender Tunc Eroglu; Whitney Hui Li, all of San Jose, CA (US)

(73) Assignee: STMicroelectronics, Inc., Carrollton, TX (US)

(*) Notice: Subject to any disclaimer, the term of this patent is extended or adjusted under 35 U.S.C. 154(b) by 0 days.

(21) Appl. No.: 09/652,689

(22) Filed: Aug. 31, 2000

(51) Int. Cl.[7] .................................................. H02P 6/14
(52) U.S. Cl. ......................... 318/254; 318/431; 318/439
(58) Field of Search ................................ 318/138, 254, 318/430–433, 439, 685, 700, 701, 720–724; 388/904

(56) References Cited

U.S. PATENT DOCUMENTS

| | | | |
|---|---|---|---|
| 4,862,052 A | 8/1989 | Unsworth et al. | |
| 5,003,241 A | 3/1991 | Rowan et al. | |
| 5,187,419 A | 2/1993 | DeLange | |
| 5,202,614 A | 4/1993 | Peters et al. | |
| 5,343,127 A | 8/1994 | Maiocchi | |
| 5,397,971 A | 3/1995 | McAllister et al. | |
| 5,466,997 A | * 11/1995 | Utenick et al. | 318/254 |
| 5,473,725 A | 12/1995 | Chen et al. | |
| 5,569,990 A | 10/1996 | Dunfield | |
| 5,619,109 A | 4/1997 | Cameron et al. | |
| 5,751,128 A | 5/1998 | Chalupa et al. | |
| 5,793,180 A | 8/1998 | Maiocchi et al. | |
| 5,844,388 A | 12/1998 | Maiocchi | |
| 5,850,129 A | 12/1998 | Yoshino | |
| 5,866,998 A | 2/1999 | Menegoli | |
| 5,869,946 A | 2/1999 | Carobolante | |
| 5,936,365 A | 8/1999 | Li et al. | |
| 6,005,359 A | 12/1999 | Brambilla et al. | |
| 6,023,141 A | 2/2000 | Chalupa | |
| 6,236,174 B1 | 5/2001 | White | |

OTHER PUBLICATIONS

Leos Chalupa, "Low Cost Effiency Sensorless Drive for Brushless Dc Motor Using MC68HC(7)05MC4", *Motorola Semiconductor Application Note*, 1999.

* cited by examiner

*Primary Examiner*—Khanh Dang
(74) *Attorney, Agent, or Firm*—Lisa K. Jorgenson; Andre Szuwalski

(57) ABSTRACT

A method and device are disclosed for controlling a polyphase motor having a plurality of windings. The device includes a memory device having stored therein data representing a predetermined driving profile, and driver circuit for driving the windings of the polyphase motor based upon the data provided by the memory unit. A feedback control loop is included having an input connected to a selected winding of the polyphase motor and providing an address signal to the memory device that is based upon a current level of the selected winding at around the time the back electromotive force (bemf) signal corresponding thereto crosses a zero reference, for controlling current provided to the windings by the driver circuit so that, for each winding, the current provided thereto is substantially in phase with a back electromotive force (emf) signal corresponding to the winding.

20 Claims, 3 Drawing Sheets

SYSTEM AND METHOD FOR OPTIMIZING TORQUE IN A POLYPHASE DISK DRIVE MOTOR

BACKGROUND OF THE INVENTION

1. Technical Field of the Invention

The present invention relates to optimizing motor torque, and particularly to a control system and method for controlling a polyphase motor that provides substantially ripple free torque.

2. Background of the Invention

Electronically switched DC motors are used in many control and regulation applications. Switched DC motors are also used in mass memory drive systems for rotating media, such as hard disks, floppy disks, optical disks, and CD-ROMs, as well as for linear media, such as tape streamers and the like. Commonly these motors are polyphase motors in a "star" configuration. It is quite common for such a motor to have three phase windings connected in a star configuration and defining six different switching phases and P number of poles.

These brushless motors are commonly driven using an integrated circuit whose output stage is represented by a polyphase full-wave bridge circuit. In the case of a three-phase motor the bridge circuit may employ six bipolar (BJT) or field effect transistors (MOS) power transistors. The motor current is linearly controlled through a transconductance loop.

As known in the art, the drive signals applied to the coils of the motor may take on different waveforms, depending upon the system and the desired operation. Two common types of driving signals are linear and digital driving signals. Linear driving signals tend to have waveforms that are fairly continuous in nature, such as a direct current (DC) signal. Digital driving signals tend to have waveforms that are switched on and off over time, such as a digital pulse train. Pulse width modulation (PWM) is one example of a scheme to drive an electric motor using a digital pulse train. For instance, commonly assigned U.S. Pat. No. 4,972,130 issued Nov. 20, 1990 discloses a particular system that uses PWM driving circuits for driving the coils of a motor.

A typical objective in either a linear or a digital motor control system is to establish and maintain the operation of the motor as required for the application. For example, in a disc drive, the rotational speed of a motor may be held substantially constant, for a given load, by applying drive signals that supply a constant current to the coils so as to maintain a somewhat constant torque.

In order to cause the desired torque in the motor, brushless motors typically require a motor controller capable of selectively connecting and disconnecting (i.e., commutating), each of the motor's coils to and from the driving signals at particular times. Calculating the proper commutation time usually requires determining, or monitoring, the location of the motor's rotor with regard to the coils. This may be accomplished, for example, by including sensors that relate such information to the motor controller circuit, or by evaluating a bemf signal generated in one or more of the coils within the motor. For sensorless motors, the bemf signal may be fed-back to the motor controller to determine the commutation time along with the difference (i.e., error) between the actual and desired rotational speeds. Such techniques are known to those skilled in the art, and include for instance, the methods and apparatuses disclosed in commonly assigned U.S. Pat. No. 5,317,243 issued May 31, 1994, U.S. Pat. No. 5,306,988 issued Apr. 26, 1994, U.S. Pat. No. 5,223,772 issued Jun. 29, 1993, and U.S. Pat. No. 5,221,881 issued Jun. 22, 1993, each of which is incorporated herein by reference.

Typically, to drive the motor in a given direction, the motor is driven with a current in the direction that provides for a positive total torque. It is known in the art that to achieve maximum efficiency the commutation should be performed when the Bemf on two phases is equal.

Unfortunately, a torque ripple may be introduced into the motor during commutation. Torque ripple can produce jitter in the motor and possibly an accompanying, acoustical noise. Torque ripple can typically be found in both linear and PWM systems because of the torque fluctuations occurring during commutation of phases due to the abrupt decay of the current in one coil and the relatively slower rise of the same in the next energized coil. The effects of torque ripple, such as introducing jitter in the system, are well known to those skilled in the art. For instance, commonly assigned U.S. Pat. No. 5,191,269 issued Mar. 2, 1993, addresses such problems in a linear system by disclosing circuitry that reduces torque ripple in a linearly driven motor.

It is therefore the goal of many systems to maximize the torque, while minimizing the torque ripple. In theory, it is possible to design an optimal sinusoidal (linear) or pseudo-sinusoidal (digital) driving circuit wherein each of the back electromotive force (bemf) phase signals is in phase with its respective driving signal's current. Assuming that the bemf signals are sinusoidal or nearly sinusoidal signals, the power flow (energy) in such a system would theoretically be a constant, in accordance with the following equation:

$$\sin^2(\omega t)+\sin^2(\omega t+120°)+\sin^2(\omega t+240°)=1.5$$

Thus, in principle such a system would yield zero torque ripple.

In practice, however, it is often very difficult to design such a digital system that controls the motor so that each bemf signal for a motor winding is in phase with the corresponding driving signal's current. Based upon the foregoing, there is a need for a motor controller for driving a polyphase motor so as to yield a substantially optimal torque.

SUMMARY OF THE INVENTION

The present invention overcomes the shortcomings in prior systems and thereby satisfies a significant need for a controller for a polyphase motor that substantially optimizes motor torque. The controller includes a memory device having stored therein data representing a predetermined drive signal profile for driving the windings of the motor. A driver circuit applies drive signals to the motor windings based upon the data provided by the memory device. A feedback control loop provides an address to the memory device that is responsive to a voltage level in one of the motor windings during the time the bemf signal thereof is at approximately a zero reference, thereby being representative of the phase difference between the current signal of the winding and the bemf signal thereof. The resulting drive signal applied to the motor is such that the current provided to each winding is substantially in phase with the back electromotive force (bemf) signal corresponding to the winding. This results in the motor having a more optimal torque. Assuming that the bemf signals are sinusoidal or nearly sinusoidal, causing the current and bemf signal for each winding to be substantially in phase with each other results in the torque of the motor being substantially constant and ripple free.

The operation of the controller includes reading stored data representing the drive signal profile based in part upon the voltage level in one of the windings when the corresponding bemf signal is at a zero voltage. Drive signals are generated based upon the data read and applied to the windings of the polyphase motor so that the current applied to each winding is substantially in phase with the corresponding bemf signal.

BRIEF DESCRIPTION OF THE DRAWINGS

A more complete understanding of the system and method of the present invention may be obtained by reference to the following Detailed Description when taken in conjunction with the accompanying Drawings wherein.

DETAILED DESCRIPTION OF THE PREFERRED EXEMPLARY EMBODIMENTS

The present invention will now be described more fully hereinafter with reference to the accompanying drawings in which a preferred embodiment of the invention is shown.

Figure 1:
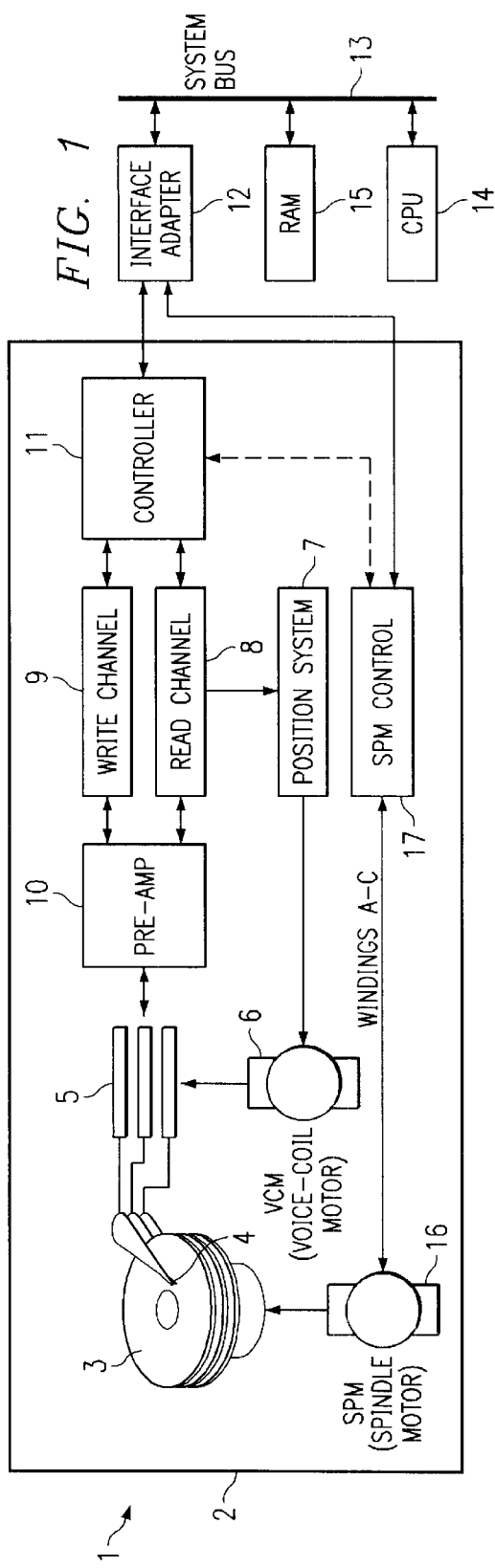
FIG. 1 is a block diagram of a disk drive according to an embodiment of the present invention.

Referring to FIG. 1, there is shown a block diagram of a data storage and/or computer system 1 including a disk drive 2 in accordance with the present invention. Disk drive 2 includes a storage medium in the form of one of more disks 3, each of which may contain data on both sides of the disk. Data is written to disks 3 and/or read therefrom by one or more read/write heads 4. The read/write head 4 is connected to an arm 5, with both read/write head 4 and arm 5 being positionally controlled by a voice-coil motor ("VCM") 6 and a position system 7. The position system 7, through VCM 6, positionally maintains and/or moves head 4 radially over the desired data on disks 3. A read channel 8 converts an analog read signal from head 4 into digital form. A write channel 9 provides data in analog form to read/write head 4 for storing on a disk 3. A pre-amplifier 10 suitably conditions data read from and data to be written to disk 4. Channel controller 11 recognizes and organizes the digital data from the read channel 8 and digital data to be sent to write channel 9 into bytes of data. An interface adapter 12 provides an interface between channel controller 11 and a system bus 13 that may be particular to the host (data storage and/or computer-based) system. The host system will also typically have other devices that communicate on system bus 13, including a central processing unit ("CPU") 14 and memory 15.

Figure 2:
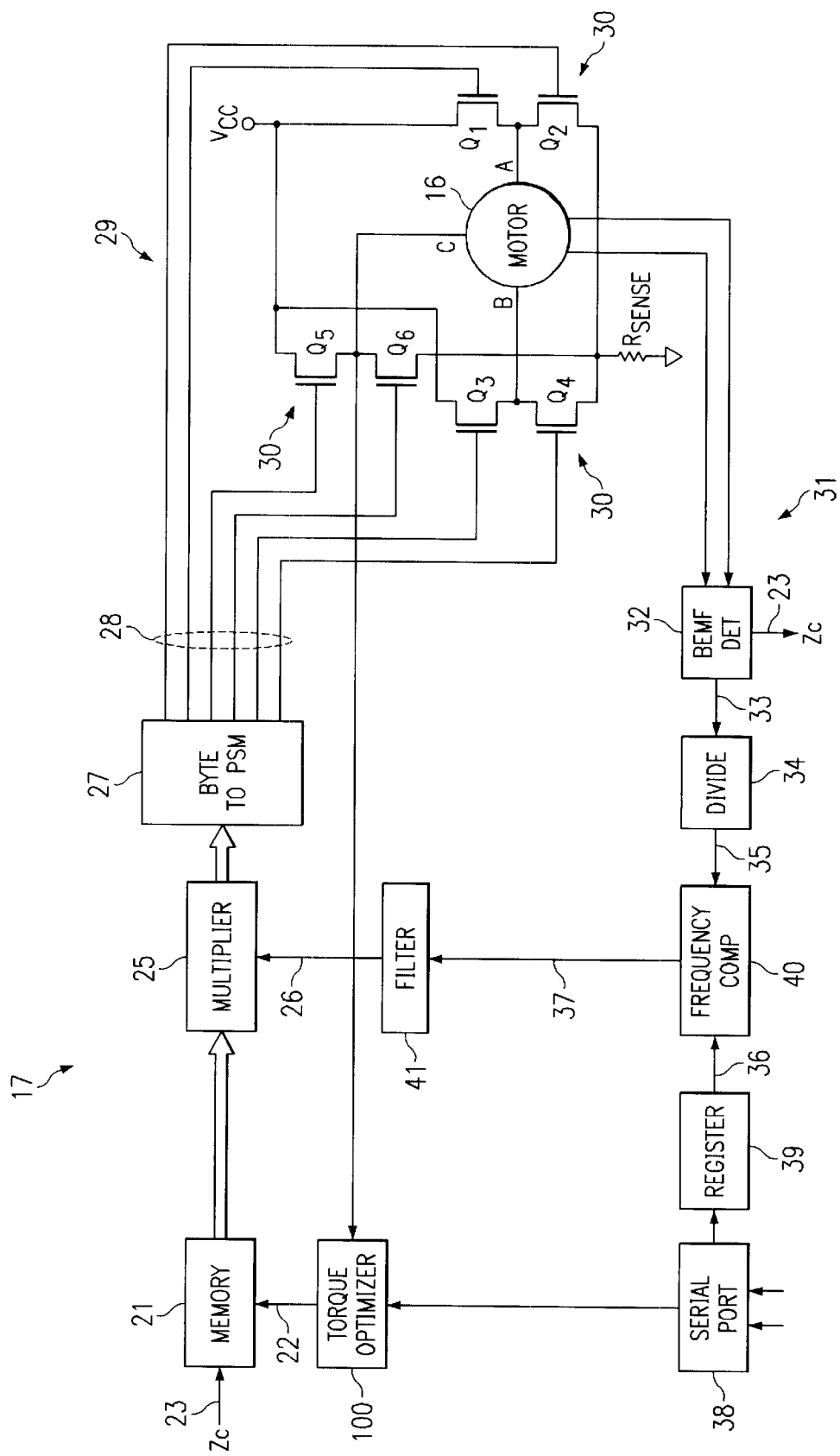
FIG. 2 is a block diagram of a controller and a corresponding spindle motor of the disk drive shown in FIG. 1.

A spindle motor ("SPM") 16 and SPM controller 17 rotate disk 3 and maintain disk 3 at the proper speed for performing a memory access operation (read or write operation). The SPM controller 17 may communicate with interface adapter 12, as shown in FIG. 2. Alternatively, $PM controller 17 may be controlled by or otherwise communicate with channel controller 11, as shown in dashed lines in FIG. 1.

It is understood that disk drive 2 may be divided into and/or include other function blocks from those shown in FIG. 1, and that the particular function block implementations illustrated in FIG. 1 are presented as an exemplary embodiment of the present invention.

Referring to FIG. 2, there is shown SPM controller 17 for controlling spindle motor 16 of disk drive system 1 in accordance with an embodiment of the present invention. The SPM controller 17 (hereafter referred to as the "controller 17") may directly communicate with interface adapter 12, as shown in FIG. 1.

Controller 17 preferably controls the sequence of drive signals applied to the input/output (I/O) terminals of phase windings or lines of motor 16 in order to, among other things, suitably spin motor 16 so that data stored on the associated media disk (not shown) may be accessed. It is understood, however, that controller 17 may be utilized in controlling the operation of a polyphase motor for-other systems as well.

Controller 17 may be implemented as a velocity control loop for motor 16. Controller 17 applies drive signals to the windings of motor 16 so that the current level in each winding of motor 16 is substantially in phase with the corresponding bemf signal. The resulting torque of motor 16 is substantially optimal and/or more optimal than otherwise. If the bemf signals of the windings of motor 16 are sinusoidal or substantially sinusoidal, the resulting torque is substantially ripple free and has a substantially constant value.

Controller 17 may be a voltage mode controller so as to provide drive voltage signals to the windings of motor 16. It is understood, however, that controller 17 may be a current mode controller.

Figure 3:
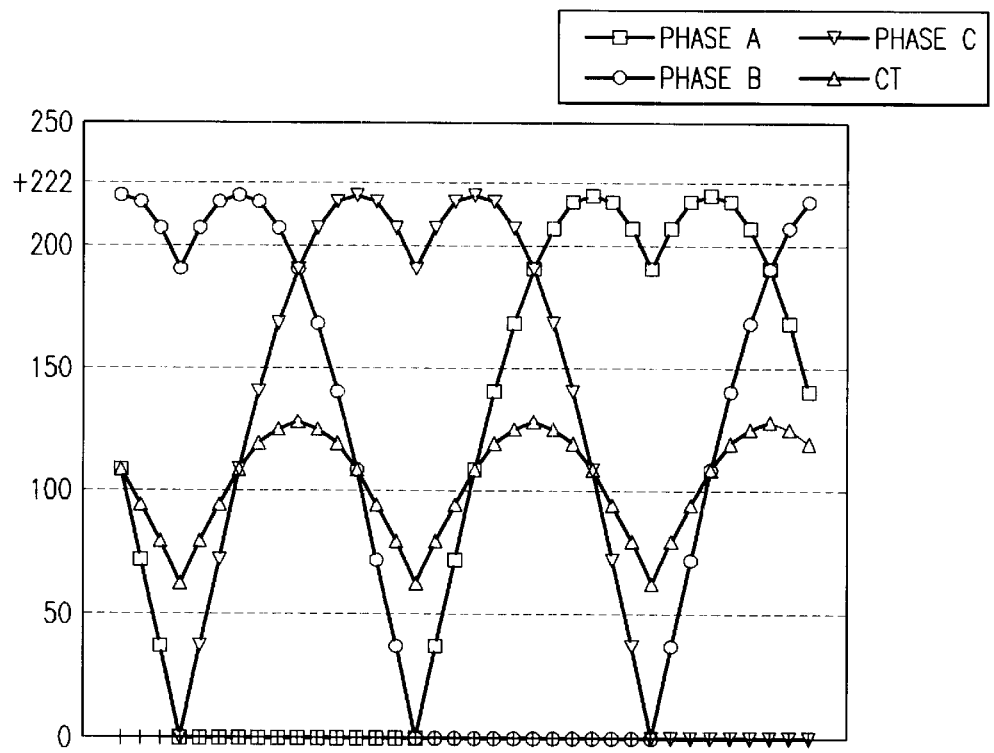
FIG. 3 is a diagram of a predetermined drive profile utilized by the controller of FIG. 2.

Controller 17 may include a memory device 21 having data representing drive voltage signals to be applied to the windings of motor 16. The particular voltage profile of the digital drive voltage signals stored in memory device 21 is such that when suitably conditioned and applied to the windings of motor 16, the drive signal current in each winding may be a pseudo-sinusoidal signal that is in phase with the corresponding bemf signal. The term "psuedo-sinusoidal"is used in this context to mean a chopped, piecewise linear sinusoidal signal. The stored voltage profile is illustrated in FIG. 3 for each winding A-C. It is understood, however, that other voltage profiles may be utilized. Although memory device 21 is illustrated in FIG. 2 as a non-volatile memory device, it is understood that memory device 21 may be a volatile memory device as well.

Memory device 21 receives an address value 22 which points to one or more storage locations from which voltage profile data is to be accessed. The generation of the address value 22 will be described in detail below. Memory device 21 further receives a feedback signal 23 that is used to synchronize the accessing of voltage profile data from memory device 21, as described further below. Voltage profile data is provided for driving each winding of motor 16.

The voltage profile data stored in memory device 21 is used to derive drive voltage signals that are applied to the windings of motor 16. According to an embodiment of the present invention, the drive technique utilized by controller 17 is a pulse shift modulation (PSM) technique, which is a type of pulse width modulation (PWM) technique. It is understood, however, that other drive techniques besides PSM may be utilized by controller 17. Both PSM and PWM techniques are known in the art and will not be discussed in detail for reasons of simplicity.

Referring to FIG. 2, the voltage profile data output accessed from memory device 21 is an input to a multiplier circuit 25. Multiplier circuit 25 digitally multiplies the value of received voltage profile data with a scalar value from a scalar signal 26. Scalar signal 26 is a feedback signal that will be described in greater detail below.

The output of multiplier circuit 25 is provided to a PSM conversion circuit 27 which generates voltage drive signals 28. The output signal provided by multiplier circuit 25 is utilized by PSM conversion circuit 27 to provide the modulated duty cycle and/or duration of assertion of voltage drive signals 28. PSM conversion circuit 27 may receive a clock signal (not shown) and include an up/down counter for generating voltage drive signals 28.

Voltage drive signals 28 are applied to drive circuitry 29 which directly applies the drive voltages to the windings of motor 16. Drive circuitry 29 may include three half bridge stages 30, with each half bridge stage 30 including a high side drive transistor and a low side drive transistor, as shown in FIG. 2.

Controller 17 tracks the operation of motor 16 to, among other things, provide a tightly controlled system and promote system stability. In a first feedback loop 31, a bemf processing element 32 is coupled to a selected winding and center tap CT of motor 16 and generates the bemf signal 33 corresponding to the winding. The bemf processing unit 32 further generates zero crossing (ZC) signal 23 which indicates when bemf signal 33 is at zero volts. The ZC signal 23 may be applied to memory device 21 so as to reset or otherwise synchronize the accessing of voltage profile data from memory device 21.

The bemf signal 33 corresponding to the selected winding of motor 16 is divided by divider 34. Divider 34 divides its input by a value corresponding to the particular characteristics of motor 16 so as to generate an angular velocity signal 35 of motor 16. For example, divider 34 may divide its input by the number of pole pairs (i.e., the number of poles divided by two) corresponding to motor 16.

The angular velocity signal 35 is then compared with a reference velocity signal 36 to develop an error signal 37. Specifically, a reference velocity signal 36 may be received from a serial interface 38 of controller 17 and stored in a register 39. It is understood, however, that controller 17 may receive the reference velocity signal 36 via a port or interface other than a serial interface. A frequency comparator and/or detector 40 receives both the angular velocity signal 35 and the reference velocity signal 36 and generates error signal 37 that indicates a frequency difference therebetween.

Controller 17 includes a filter 41 which receives error signal 37 and provides a filtered error signal that is the scalar signal 26 provided to multiplier circuit 25. Filter 41 may be, for example, a low pass filter. Filter 41 may be implemented as a second order infinite impulse response (IIR) filter, but it is understood that filter 41 may be of a different order and have other filter implementations as well. Filter 41 is described in detail in related co-pending application entitled "Embedded Programmable Filter for Disk Drive Velocity Control", Ser. No.09/625,068, filed Jul. 25, 2000.

As explained above, in order to provide a more optimized torque, controller 17 controls motor 16 so that the drive signal current for a winding is substantially in phase with the corresponding bemf signal. It is again noted that if the bemf signals are sinusoidal or substantially sinusoidal and in phase with their respective current signals, the resulting torque is substantially constant and ripple-free. In accordance with an embodiment of the present invention, controller 17 includes a second feedback loop 100 that provides a way for more finely controlling the voltage profile data read from memory device 21 so that the resulting drive signals provide current in each winding of motor 16 that is in phase with the corresponding bemf signal. Second feedback loop 100 determines the phase difference between the drive signal current and the corresponding bemf signal for a single selected winding and uses the determined phase difference to adjust the voltage applied to motor 16 accordingly.

Figure 5:
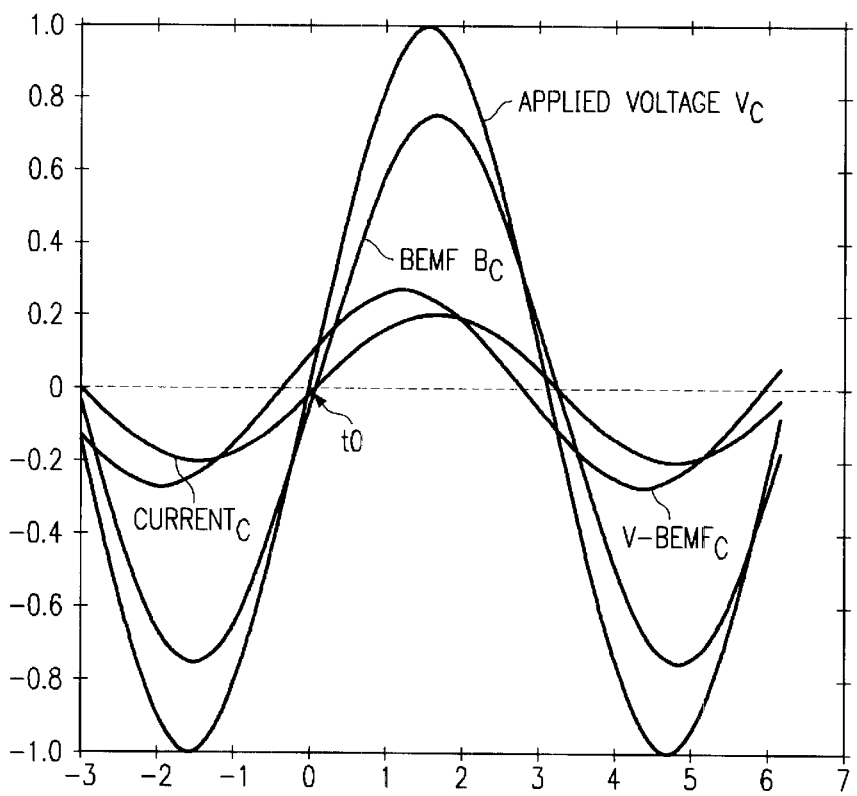
FIG. 5 is a waveform of electrical signals associated with a winding of the spindle motor shown in FIG. 1.

In particular, second feedback loop 100 measures the current level in a selected winding around the time the corresponding bemf signal is zero. Referring to FIG. 5, around time t0, the winding is tristated in order to measure the bemf signal of the selected winding as described above with respect to bemf processing unit 32. As can be seen, the current in the selected winding is forced to zero during this time and thus current in the winding cannot be measured. However, since the bemf signal is not measured around the next time the bemf signal is expected to cross the zero axis (on the falling edge of the bemf signal), the current is measured at this expected time. Controller 17 adjusts the voltage drive signals applied to the windings of motor 16 based upon the results of consecutive, periodic measurements of the winding current at the times the falling edge of the bemf signal is expected to cross the zero axis.

Figure 4:
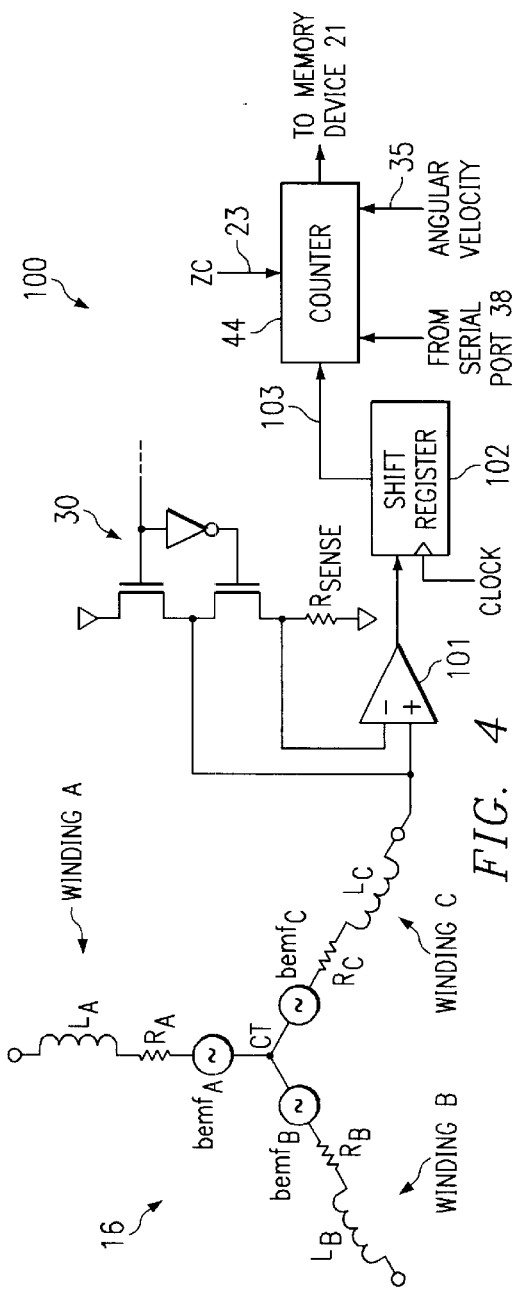
FIG. 4 is a block diagram of a feedback loop of the controller of FIG. 2.

Referring to FIG. 4, second feedback loop 100 may include a comparator 101 having inputs connected across the low side drive transistor of the half bridge stage 30 driving the winding of motor 16 from which the bemf signal is measured. Comparator 101 generates a binary signal that indicates the polarity of the voltage (and hence the current) on the winding, relative to center tap CT. A circuit, such as a shift register 102, periodically samples and/or stores the output of the comparator 101 and maintains a number of such samples. The output of comparator 101 is sampled at each time the falling edge of the bemf signal corresponding to the selected winding is expected to cross the zero axis, as explained above.

An output signal 103 of shift register 102 indicates whether two or more consecutive samples are both the same logic level. For instance, if the voltage appearing on the selected winding is greater than the voltage at center tap CT (thereby indicating a current level flowing from the winding and the current lagging the bemf signal in phase) in consecutive samples, the output signal 103 will have a first value. If the voltage appearing on the winding is less than the voltage at center tap CT (thereby indicating a current level flowing into the winding and the current leading the bemf signal in phase) in consecutive samples, output signal 103 will have a second value.

Referring to FIG. 2, angular velocity signal 35, which is representative of the measured angular velocity of motor 16, is applied as an input to a counter 44. The output of counter 44 is the address signal 22 applied to the address input of memory device 21 so that the memory locations of memory device 21 may be substantially sequentially accessed. Counter 44 may be an up/down counter that may receive as a reset signal the measured zero crossing ZC signal 23 so as to synchronize the voltage profile data from memory device 21 with the zero crossings of the bemf signal corresponding to the selected winding.

Counter 44 receives signal 103 generated by shift register 102. Signal 103 is a control input to counter 44 that will cause counter 44 perform a number of operations. Counter 44 will increment, decrement or remain in the same state based upon the value of signal 103. In this way, second feedback loop 100 provides a fine control adjustment of the timing for reading the voltage profile data from memory device 21 to cause an approximately one degree change in the phase of the voltage drive signals 28 applied to the windings of motor 16. By finely controlling application of the voltage drive signals 28 to the windings of motor 16, the current in the windings are substantially in phase with the corresponding bemf signals, as shown in FIG. 5.

Counter 44 and/or the second feedback loop 100 may include additional features. For instance, during the time that the first and second feedback loops have already closely controlled and/or regulated motor 16, it may be unnecessary for the second feedback loop 100 to continue in providing feedback signals to counter 44. Consequently, counter 44 may be disabled so that it holds the same value therein. In addition, counter 44 may be selectively controlled to receive information generated externally to controller 17 instead of from shift register 102. For example, the information generated externally from controller 17 may be received at serial interface/port 38 (FIG. 2) or from another interface/port, and provided to an input of counter 44. In this way, control of the application of the drive signals to the windings of motor 16 may be selectively provided by another device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A controller for a polyphase motor having a plurality of windings, comprising:
    a memory device having stored therein data representing a predetermined driving profile;
    a driver circuit for driving the windings of the polyphase motor based upon the data provided by the memory unit; and
    a feedback control loop having an input connected to a selected winding of the polyphase motor and providing an address signal to the memory device that is based upon a current level of the selected winding at around the time the back elecctromotive force (bemf) signal corresponding thereto is expected to cross a zero reference, for controlling current provided to the windings by the driver circuit so that, for each winding, the current provided thereto is substantially in phase with a back electromotive force (emf) signal corresponding to the winding.

2. The controller of claim 1, wherein the feedback control loop comprises:
    a counter, responsive to the current level of the selected winding at around the time the back electromotive force (bemf) signal corresponding thereto is at approximately the zero reference, for generating an address signal input to the memory device.

3. The controller, of claim 2, wherein the feedback control loop comprises:
    a register circuit for substantially periodically sampling the current, level of the selected winding at around the time the back electromotive force (bemf) signal corresponding thereto is expected to be at approximately the zero reference, and generating an output signal to which the counter is responsive.

4. The controller of claim 3, wherein:
    the output signal of the register circuit indicates an occurrence of consecutive samples of the current level of the selected winding having the same polarity.

5. The controller of claim 4, wherein:
    the output signal of the register circuit is at a first value when consecutive samples of the current level of the selected winding have a positive polarity and a second value when consecutive samples of the current level of the selected winding have a negative polarity.

6. The controller of claim 4, wherein:
    the counter selectively increments and decrements based upon the value of the output signal of the register circuit.

7. The controller of claim 1, wherein:
    the feedback control loop selectively offsets the phase of drive signals applied to the windings of the motor based upon the current level of the selected winding at around the time the back electromotive force (bemf) signal corresponding thereto is expected to be at approximately the zero reference.

8. The controller of claim 1, further comprising:
    a conversion circuit, connected between the memory device and the driver circuit, for converting the data provided by the memory unit into drive signals.

9. The controller of claim 1, wherein:
    the feedback control loop selectively offsets the phase of drive signals applied to the windings of the motor by approximately one degree, based upon the current level of the selected winding at around the time the back electromotive force (bemf) signal corresponding thereto is expected to be at approximately the zero reference.

10. The controller of claim 1, further comprising:
    a register circuit for substantially periodically sampling the current level of the selected winding at around the time the back electromotive force (bemf) signal corresponding thereto is expected to be at approximately the zero reference, and generating an output signal to which the memory device is responsive.

11. The controller of claim 1, wherein the feedback control loop comprises:
    a counter for generating an address value applied to an address input of the memory device, the counter selectively increments and decrements based upon the current level of the selected winding at around the time the back electromotive force (bemf) signal corresponding thereto is expected to be at approximately the zero reference.

12. A method of controlling a polyphase motor having a plurality of windings, comprising:
    maintaining stored data representing a predetermined driving profile;
    reading the stored data based upon a difference in phase between a current in a selected winding and a back electromotive force (bemf) signal corresponding thereto, comprising:
        measuring a voltage appearing on the selected winding approximately when the bemf signal corresponding thereto is expected to cross a zero reference voltage;
        generating an address value representing a location where a portion of the stored data is maintained, based upon a frequency of the motor;
        adjusting the address value by an amount based upon the measured voltage; and
        applying the adjusted address value to the memory device;
    converting the stored data into drive signals; and
    applying the drive signals to the windings of the polyphase motor so that, for each winding, current provided to the winding is substantially in phase with a back electromotive force (bemf) signal corresponding to the winding.

13. The method of claim 12, further comprising:

determining whether consecutive measurements of the voltage appearing on the selected winding have the same polarity, the adjusting adjusts the address value based upon an affirmative determination that the consecutive measurements of the voltage have the same polarity.

14. The method of claim 12, wherein the adjusting comprises:

selectively incrementing and selectively decrementing the address value.

15. A disk drive device, comprising:

at least one disk on which data is stored;

at least one head positioned proximally to the disk;

a spindle motor, connected to spin the disk, having a rotor and a plurality of windings; and spindle motor control circuitry, connected to the phase windings of the spindle motor, for controlling the spindle motor, the spindle motor control circuitry comprising:

a driver circuit for driving the windings of the spindle motor; and a feedback control loop having an input connected to a selected winding of the spindle motor and providing drive signals to the drive circuit that are based upon a current level of the selected winding at around the time the back electromotive force (bemf) signal corresponding thereto is expected to cross a zero reference, so that, for each winding of the spindle motor, the current provided thereto is substantially in phase with a back electromotive force (emf) signal corresponding to the winding.

16. The disk drive of claim 15, wherein the spindle motor control circuitry further comprises:

a memory device having stored therein data representing a predetermined driving profile for the windings of the spindle motor; and a counter, responsive to the current level of the selected winding at around the time the back electromotive force (bemf) signal corresponding thereto is expected to be at approximately the zero reference, for generating an address signal input to the memory device.

17. The disk drive of claim 16, wherein the spindle motor control circuitry further comprises:

a register circuit for substantially periodically sampling the current level of the selected winding at around the time the back electromotive force (bemf) signal corresponding thereto is expected to be at approximately the zero reference, and generating an output signal to which the counter is responsive.

18. The disk drive of claim 17, wherein:

the output signal of the register circuit indicates an occurrence of consecutive samples of the current level of the selected winding having the same polarity.

19. The disk drive of claim 17, wherein:

the counter selectively increments and decrements based upon the value of the output signal of the register circuit.

20. The disk drive of claim 15, wherein the spindle motor control circuitry further comprises:

a circuit for substantially periodically sampling the current level of the selected winding at around the time the back electromotive force (bemf) signal corresponding thereto is expected to be at approximately the zero reference, and generating an output signal to which the driver circuit is responsive.

* * * * *

UNITED STATES PATENT AND TRADEMARK OFFICE
CERTIFICATE OF CORRECTION

PATENT NO.    : 6,498,446 B2  Page 1 of 1
DATED         : December 24, 2002
INVENTOR(S)   : Paolo Menegoli et al.

It is certified that error appears in the above-identified patent and that said Letters Patent is hereby corrected as shown below:

Column 3,
Line 63, replace "$PM controller 17" with -- SPM controller 17 --

Column 7,
Line 46, replace "force (emf) signal" with -- force (bemf) signal --
Lines 52-53, replace "thereto is at approximately" with -- thereto is expected to be at approximately --
Line 56, replace "The controller, of" with -- The controller of --
Line 59, replace "current, level" with -- current level --

Signed and Sealed this

Twenty-second Day of July, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,498,446 B1
DATED : December 24, 2002
INVENTOR(S) : Paolo Menegoli et al.

It is certified that error appears in the above-identified patent and that said Letters Patent is hereby corrected as shown below:

Column 7,
Line 41, replace "elecctromotive force" with -- electromotive force --

Signed and Sealed this

Eighteenth Day of May, 2004

JON W. DUDAS
*Acting Director of the United States Patent and Trademark Office*